US009644666B2

(12) United States Patent
Oberndorfer et al.

(10) Patent No.: US 9,644,666 B2
(45) Date of Patent: May 9, 2017

(54) ELECTRICALLY INSULATING CAGE NUT

(71) Applicant: Ruia Global Fasteners AG, Neuss (DE)

(72) Inventors: Siegfried Oberndorfer, Gerabronn (DE); Detlef Graef, Weil im Schonbuch (DE)

(73) Assignee: Nedschroef Schrozberg GmbH, Altena (DE)

( * ) Notice: Subject to any disclaimer, the term of this patent is extended or adjusted under 35 U.S.C. 154(b) by 32 days.

(21) Appl. No.: 14/789,141

(22) Filed: Jul. 1, 2015

(65) Prior Publication Data
US 2015/0345535 A1    Dec. 3, 2015

Related U.S. Application Data

(62) Division of application No. 13/696,952, filed as application No. PCT/DE2011/050013 on May 5, 2011, now Pat. No. 9,080,592.

(30) Foreign Application Priority Data

May 12, 2010  (DE) .................... 20 2010 006 746 U

(51) Int. Cl.
*B21D 39/03* (2006.01)
*F16B 37/04* (2006.01)

(52) U.S. Cl.
CPC .......... *F16B 37/044* (2013.01); *B21D 39/032* (2013.01)

(58) Field of Classification Search
CPC ........ F16B 37/04; F16B 37/044; F16B 39/24; F16B 39/284; B21D 39/026; B21D 39/032

USPC ................ 470/18, 20, 21; 411/104, 111, 112
See application file for complete search history.

(56) References Cited

U.S. PATENT DOCUMENTS

| 2,333,388 | A |   | 11/1943 | Poupitch |
| 4,348,140 | A |   | 9/1982  | Bergholz et al. |
| 4,762,451 | A |   | 8/1988  | Collins |
| 5,170,984 | A |   | 12/1992 | Ruckwardt |
| 5,624,319 | A | * | 4/1997  | Golczyk ................ B21D 35/00 411/113 |
| 5,630,086 | A |   | 5/1997  | Marietta et al. |
| 7,086,817 | B2 | * | 8/2006 | Clinch .................. F16B 37/065 411/103 |

(Continued)

FOREIGN PATENT DOCUMENTS

DE  9409087   8/1994
DE  19533138  11/1996
(Continued)

*Primary Examiner* — Edward Tolan
(74) *Attorney, Agent, or Firm* — Gable Gotwals

(57) ABSTRACT

An electrically insulating cage nut (10) having a nut body (12) which is held in a cage (14), in which the nut body (12) has a cylindrical attachment (16) and a broadened holding element (18), and the cylindrical attachment (16) has an internal thread (20) and extends through an opening (22) in the cage (14) to the outside, wherein the internal diameter of the opening (22) is substantially larger than the external diameter of the cylindrical attachment (16), but is smaller than the external size of the holding element (18), and an insulator apparatus (24) is arranged between the cage (14) and cylindrical attachment (16), wherein the insulator apparatus (24) is formed integrally, and in consequence the cage nut (10) consists of only three components (12, 14, 24).

5 Claims, 1 Drawing Sheet

(56) References Cited

U.S. PATENT DOCUMENTS

| | | |
|---|---|---|
| 7,255,521 B2 | 8/2007 | Yake et al. |
| 7,275,612 B2 | 10/2007 | Komura et al. |
| 2004/0136804 A1 | 7/2004 | Clinch et al. |
| 2004/0191612 A1* | 9/2004 | Akita ................... H01M 2/0426 429/94 |
| 2009/0211058 A1* | 8/2009 | Nagayama .............. F16B 23/00 16/446 |
| 2012/0190232 A1 | 7/2012 | Akuta |

FOREIGN PATENT DOCUMENTS

| | | | |
|---|---|---|---|
| EP | 1600645 | 11/2005 | |
| GB | 678532 A | * 9/1952 | ........... A43C 15/161 |
| JP | 2005-337458 | 12/2005 | |
| JP | 2006-300110 | 11/2006 | |
| WO | 2006/112248 | 10/2006 | |

* cited by examiner

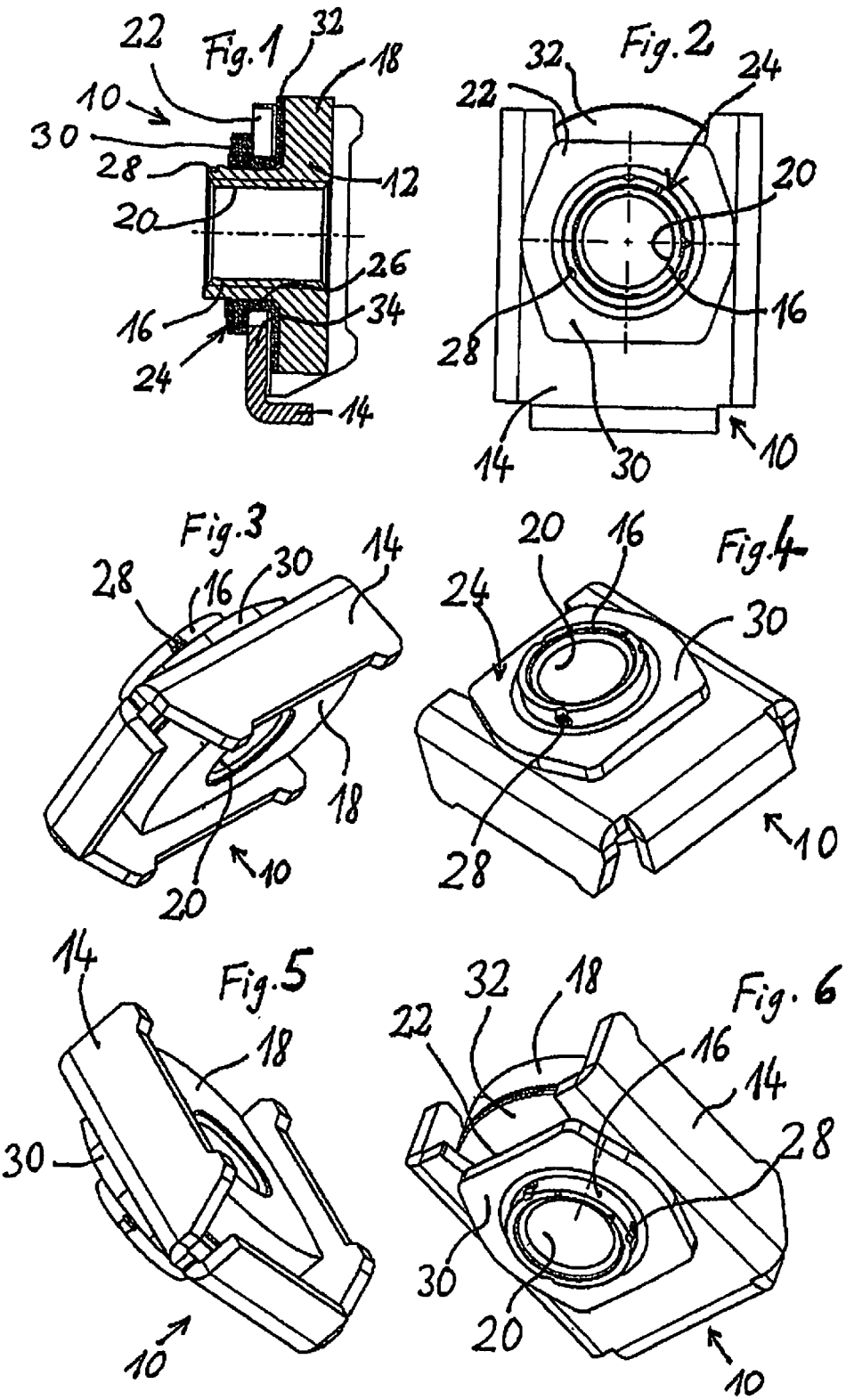

ELECTRICALLY INSULATING CAGE NUT

CROSS-REFERENCE TO RELATED APPLICATIONS

This application is a divisional application of co-pending U.S. application Ser. No. 13/696,952 filed Nov. 8, 2012, which is the U.S. National Phase application of PCT Application PCT/DE2011/050013 filed May 5, 2011, which claims priority to German Patent Application No. 20 2010 006 746.4 filed May 12, 2010, each of which is incorporated herein by reference.

TECHNICAL FIELD

The present invention relates to an electrically insulating cage nut comprising a nut body which is contained in a cage, in which the nut body comprises a cylindrical projection and a widened holding element, and the cylindrical projection has an internal thread and extends outwards through an opening in the cage, the internal diameter of the opening being considerably larger than the external diameter of the cylindrical projection (the nut) but smaller than the external dimensions of the holding element (flange of the nut), and an insulator device being arranged between the cage and the cylindrical projection.

Electrically insulating cage nuts of this type are preferably used where the internal thread of a nut fastened to a component is to be prevented from being clogged with the coating material or finish during electrostatic coating (that is to say, for example, during electrophoresis coating) of the component.

PRIOR ART

In accordance with the prior art according to DE 94 09 087 U1 and DE 195 33 138 C1, which is hitherto standard in the industry, electrically insulated cage nuts of this type comprise a two-part insulator element which push into the opening in the cage from outside and are retained there by an insulating shim fastened to the cylindrical projection of the nut body.

This prior art provides a complex and laborious production method, since at least four individual components are always required, and in addition the construction is not very reliable in all installation positions (overhead, suspended laterally when passing through the immersion coating bath) and not very resistant.

DESCRIPTION OF THE INVENTION

The object of the invention is therefore to develop an electrically insulating cage nut of this type in such a way that manufacturing becomes significantly simpler and more cost-effective, and at the same time the stability and reliability is considerably improved in all installation positions of the cage nut.

This object is achieved according to the invention in that the insulator device is formed in one piece, and therefore only three components are required.

It is particularly preferred for the insulator device to comprise a hollow cylindrical body, by means of which said device is rigidly attached to the cylindrical projection and said body comprises insulating plates extending outwards in a planar manner at the two ends of said body, between which plates the edge of the opening is movably received in the cage at least radially relative to the axis of rotation of the cylindrical projection.

It is particularly preferred for the insulating plate arranged on the holding element to cover the entire holding element towards the cage. In order to achieve protection against torsion and the insulating effect by means of as few components as possible, it is preferred for the insulating plate arranged on the holding element to be in the shape of an elongate rectangle and to comprise two longer sides opposite one another. It is particularly preferred for the insulating plate facing away from the holding element to be in the shape of a rounded, laterally curved rectangle. The cage nut according to the invention can be particularly simply and cost-effectively produced by the insulator device being inserted laterally into the cage and the nut body being pushed or pressed into the insulator device in the axial direction and being caulked there.

In the following, the present invention will be described in greater detail with reference to the embodiment shown in the appended drawings.

BRIEF DESCRIPTION OF THE DRAWINGS

FIG. 1 is an axial cross-section of a cage nut according to the invention;

FIG. 2 shows the cage nut according to the invention, viewed from the screw-in side;

FIG. 3 to 6 are various spatial views of the cage nut according to the invention.

PREFERRED EMBODIMENT OF THE INVENTION

FIG. 1 shows a cage nut according to the invention which has been cut along the screw-in axis.

The cage nut 10 shown according to the invention comprises a nut body 12 which is received in a cage 14. The nut body 12 comprises a cylindrical projection 16 and a widened holding element 18. The cylindrical projection 16 has a coaxial internal thread 20 and extends outwards through an opening 22 in the cage 14.

The internal diameter of the opening 22 is considerably larger than the external diameter of the cylindrical projection 16, but smaller than the external dimensions of the holding element 18.

Here, the opening 22 is open towards one side in order to make it easier to mount the nut body 12 in the cage 14.

According to the invention, an insulator device 24 which is formed in one piece is arranged between the cage 14 and the cylindrical projection 16. The insulator device 24 comprises a hollow cylindrical body 26, by means of which said device is rigidly attached to the cylindrical projection 16. In this case, the insulator device 24 can be attached to the cylindrical projection 16 of the nut body 12 by interference fit, by bonding or, as can be seen here with reference to the caulk channels 28, by caulking. The caulking between the cylindrical projection 16 of the nut body 12 and the insulator device 24 is preferably carried out at three points each spaced apart by 120°, or four points (not shown) each spaced apart by 90°. As a result, the nut is located in the cage 14 and the insulator device 24 in such a way that it cannot be lost. The hollow cylindrical body 26 of the insulator device 24 comprises insulating plates 30, 32 extending outwards in a planar manner at the two ends of said body. Said two insulator plates 30 and 32 are attached to the hollow cylindrical body 26 at a distance from one another in the axial direction in such a way that the cage 14 can move slightly (not in a clamping manner) between the two insulator plates 30, 32. Four raised points (not shown) are attached to the insulator plates 30, 32 in such a way that the insulator plates do not contact the cage 14 over the entire surface thereof, but only at tangential points. Bonding by adhesive and cohesive forces of the coatings is thus prevented. The edge 34 of the opening 22 is received between said insulator plates 30, 32 in the cage 14 in such a way that it is movable at least radially relative to the axis of rotation of the cylindrical projection 16.

The insulating plate 30 facing away from the holding element 18 is in the shape of a rounded, laterally curved rectangle, while the shape of the insulating plate 32 arranged on the holding element covers the entire holding element 18 towards the cage 14 with a slight protrusion, in such a way that the nut body 12 does not directly touch the cage 14, whether it is in a horizontal, overhead or lateral position, and therefore insulates the nut body. Therefore, there cannot be an electrical flux.

The holding element 18 is in the shape of a thick, cylindrical circular disc of which two opposite sides are cut off.

By means of the present invention, manufacturing an electrically insulated cage nut is made considerably simpler, the mechanical resistance being considerably improved and improved insulation being ensured between the nut body and the cage at the same time.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. A method for producing a cage nut, said method comprising the following steps:
   inserting an insulator device being formed of one piece into an opening through and being opened in one side of the cage, the opening having an internal diameter substantially larger than an external diameter of a cylindrical projection of a nut body and substantially smaller than external dimensions of a nut body holding element;
   pushing or pressing the nut body, having a cylindrical projection having an internal thread and a widened holding element, into the insulator device in an axial direction; and
   caulking between the nut body and the insulator device.

2. The method for producing a cage nut according to claim 1 wherein the insulator device comprises a hollow cylindrical body for rigidly attaching the insulator device to the cylindrical projection of the nut body, and the hollow cylindrical body comprises insulating plates extending outwards in a planar manner at two ends of the hollow cylindrical body, between the insulating plates an edge of an opening is movably received in the cage at least radially relative to an axis of rotation of the cylindrical projection.

3. The method for producing a cage nut according to claim 2 wherein one of the insulating plates being arranged on a holding element covers the entire holding element towards the cage with a slight protrusion, such that the nut body does not touch the cage, whether being in a horizontal, overhead or lateral position.

4. The method for producing a cage nut according to claim 3 wherein the insulating plate arranged on the holding element is in the shape of an elongated rectangle and comprises two longer sides opposite one another.

5. The method for producing a cage nut according to claim 2 wherein one insulating plate faces away from the holding element and is in the shape of a rounded, laterally curved rectangle.

\* \* \* \* \*